(12) United States Patent
Li et al.

(10) Patent No.: US 11,467,334 B2
(45) Date of Patent: Oct. 11, 2022

(54) GLASS-BASED TERAHERTZ OPTICAL WAVEGUIDES AND METHODS OF FORMING SAME

(71) Applicant: CORNING INCORPORATED, Corning, NY (US)

(72) Inventors: Ming-Jun Li, Horseheads, NY (US); Gary Richard Trott, San Mateo, CA (US)

(73) Assignee: Corning Incorporated, Corning, NY (US)

( * ) Notice: Subject to any disclaimer, the term of this patent is extended or adjusted under 35 U.S.C. 154(b) by 12 days.

(21) Appl. No.: 16/638,604

(22) PCT Filed: Aug. 20, 2018

(86) PCT No.: PCT/US2018/047048
§ 371 (c)(1),
(2) Date: Feb. 12, 2020

(87) PCT Pub. No.: WO2019/036706
PCT Pub. Date: Feb. 21, 2019

(65) Prior Publication Data
US 2020/0174180 A1 Jun. 4, 2020

Related U.S. Application Data

(60) Provisional application No. 62/547,342, filed on Aug. 18, 2017.

(51) Int. Cl.
*G02B 6/02* (2006.01)
*G02B 6/12* (2006.01)

(52) U.S. Cl.
CPC ..... *G02B 6/02038* (2013.01); *G02B 6/02395* (2013.01); *G02B 6/12* (2013.01); *G02B 2006/12038* (2013.01)

(58) Field of Classification Search
None
See application file for complete search history.

(56) References Cited

U.S. PATENT DOCUMENTS

| 3,814,499 A | 6/1974 | Marcatili |
| 3,932,162 A | 1/1976 | Blankenship |

(Continued)

FOREIGN PATENT DOCUMENTS

| CN | 102162876 A | 8/2011 |
| CN | 102338905 A | 2/2012 |

(Continued)

OTHER PUBLICATIONS

Atakaramians et al; "Fiber-Drawn Metamaterial for THz Waveguiding and Imaging"; J. Infrared Mili Terahz Waves (2017) 38:1162-1178.

(Continued)

*Primary Examiner* — Chris H Chu
(74) *Attorney, Agent, or Firm* — Svetlana Short; Russell S. Magaziner

(57) ABSTRACT

The glass-based THz optical waveguides (10) disclosed herein are used to guide optical signals having a THz frequency in the range from 0.1 THz to (10) THz and include a core (20) surrounded by a cladding (30). The core has a diameter D1 in the range from (30) μm to 10 mm and is made of fused silica glass having a refractive index $n_1$. The cladding is made of either a polymer or a glass or glass soot and has a refractive index $n_2 < n_1$ and an outer diameter D2 in the range from 100 μm to 12 mm. The THz optical waveguides can be formed using processes that are extensions of either fiber, ceramic and soot-based technologies. In an example, the THz waveguides have a dielectric loss $D_f < 0.005$ at 100 GHz.

15 Claims, 12 Drawing Sheets

(56) References Cited

U.S. PATENT DOCUMENTS

| | | |
|---|---|---|
| 6,418,258 B1 | 7/2002 | Wang |
| 6,539,155 B1 | 3/2003 | Broeng et al. |
| 6,573,813 B1 | 6/2003 | Joannopoulos et al. |
| 7,106,933 B2 | 9/2006 | Han |
| 7,409,132 B2 | 8/2008 | Sun et al. |
| 7,440,671 B2 | 10/2008 | Sarukura et al. |
| 8,474,287 B2 | 7/2013 | Bickham et al. |
| 9,300,025 B2 | 3/2016 | Herbsommer et al. |
| 10,079,418 B2 | 9/2018 | Nickel et al. |
| 2004/0037497 A1 | 2/2004 | Lee |
| 2005/0242287 A1* | 11/2005 | Hakimi .................. G02F 1/353 250/363.09 |
| 2006/0165360 A1* | 7/2006 | Siegel .................. A61B 5/0084 385/125 |
| 2006/0263022 A1 | 11/2006 | Han |
| 2009/0097809 A1 | 4/2009 | Skorobogatiy et al. |
| 2010/0135626 A1 | 6/2010 | Sun et al. |
| 2011/0050371 A1* | 3/2011 | Deal ........................ G02B 6/10 333/239 |
| 2012/0097850 A1* | 4/2012 | Darcie .................. G02B 6/102 250/340 |
| 2013/0063159 A1* | 3/2013 | Koyama ................ B82Y 20/00 324/639 |
| 2016/0072173 A1 | 3/2016 | Herbsommer et al. |

FOREIGN PATENT DOCUMENTS

| | | |
|---|---|---|
| CN | 102354017 A | 2/2012 |
| CN | 106450627 A | 2/2017 |
| GB | 1462416 A | 1/1977 |
| WO | 99/64904 A1 | 12/1999 |
| WO | 01/96919 A1 | 12/2001 |
| WO | 2015/180850 A1 | 12/2015 |

OTHER PUBLICATIONS

Atakaramians et al; "Terahertz Dielectric Waveguides"; Advances in Optics and Photonics 5, 169215 (2013) doi:10.1364/AOP.5.000169.

Chen et al; "Complex Dielectric Permittivity Measurements of Glasses at Millimeter Waves and Terahertz Frequencies" Proceedings of The 36th European Microwave Conference, pp. 384-387, (2006.

International Search Report and Written Opinion of the International Searching Authority; PCT/US2018/047048; dated Nov. 19, 2018; 13 Pages; European Patent Office.

Microstructured Fibers: Superdots Enhance Microstructured-Fiber Properties and Remote-Sensing Capabilities; Laser Focus World; 17 Pages; (2020).

Oven et al; "Microwave Loss of Coplanar Waveguides On Electrically Ion Depleted Borosilicate Glass", IEEE Microwave and Wireless Components Letters, vol. 15,#2 Feb. 2005 pp. 125-127.

Ponseca et al; "Transmission of Terahertz Radiation Using a Microstructured Polymer Optical Fiber" ; Optics Letters; vol. 33, No. 9; (2008) pp. 902-904.

Zhang et al; "A Study of Microstructured Fibre Design for Terahertz Applications" Proceedings of the 41st European Microwave Conference pp. 862-865 (2011.

Chinese Patent Application No. 201880053370.8, Office Action dated Jan. 26, 2022, 12 pages (6 pages of English Translation and 6 pages of original document), Chinese Patent Office.

* cited by examiner

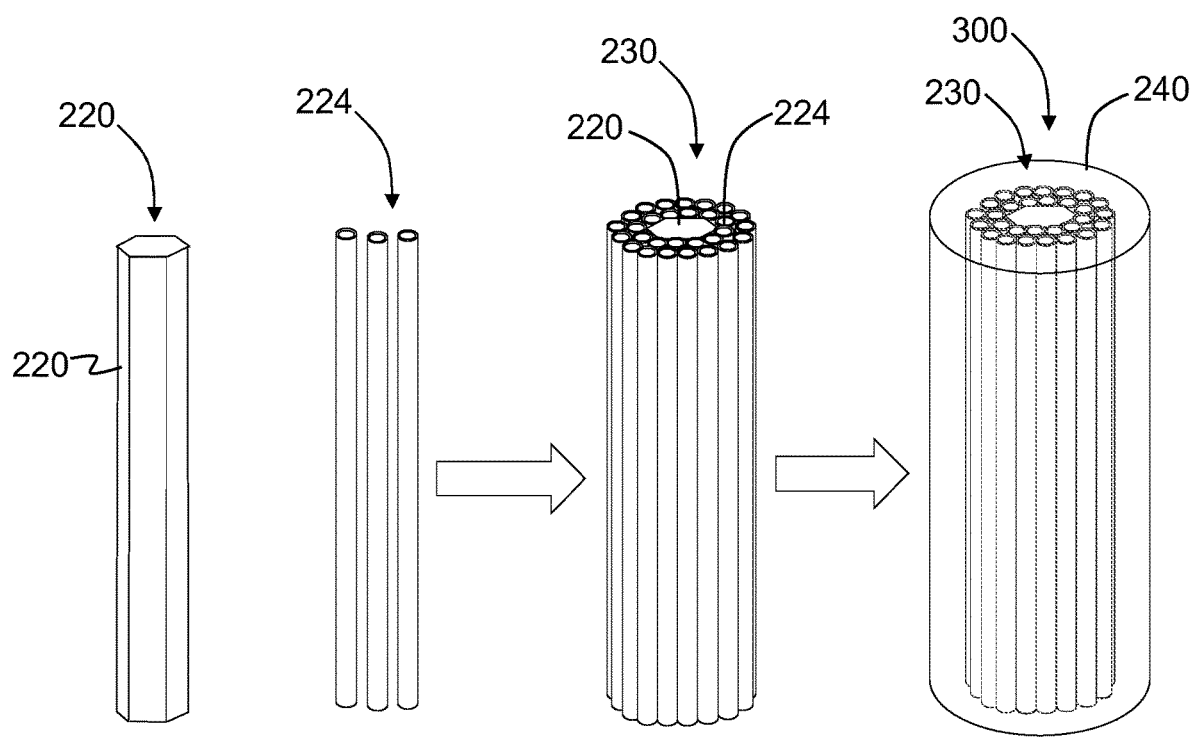
*FIG. 4A* *FIG. 4B* *FIG. 4C* *FIG. 4D*

GLASS-BASED TERAHERTZ OPTICAL WAVEGUIDES AND METHODS OF FORMING SAME

This application claims the benefit of priority under 35 U.S.C. § 371 of International Application No. PCT/US18/47048, filed on Aug. 20, 2018, which claims the benefit of priority under 35 U.S.C. § 119 of U.S. Provisional Application Ser. No. 62/547,342 filed on Aug. 18, 2017 the content of which is relied upon and incorporated herein by reference in its entirety.

FIELD

The present disclosure relates to optical waveguides, and in particular to glass-based optical waveguides that operate at terahertz wavelengths, and methods of forming same.

BACKGROUND

Optical communication systems typically operate at the near-infrared bands of the electromagnetic spectrum having wavelengths on the order of 1000 nm to 2000 nm. Other types of communication systems such as cell phone systems operate at radio-wave band of the electromagnetic (EM) spectrum from about 3 KHz to 60 GHz, with plans to extend this range into the microwave band, which extends up to about 300 GHz. The move to higher and higher RF and microwave frequencies has been enabled in part by developments in state of the art CMOS-based EM radiation sources and receivers that can operate at frequencies greater than 100 GHz.

The terahertz wavelength range of the EM spectrum is generally considered to range from 0.1 THz (=100 GHz) to 10 THz (10,000 GHz), where the corresponding free-space wavelength is denoted $\lambda_o$ and is in the range from 3 mm to 0.03 mm. In a dielectric material with the real part of the dielectric constant $\varepsilon_r$, the wavelength $\lambda$ is given by $\lambda=\lambda_o/(\varepsilon_r)^{1/2}$ More generally, the dielectric constant is expressed as $\varepsilon_r=\varepsilon_r+i\varepsilon_i$, where $\varepsilon_i$ is the imaginary or lossy part of the dielectric constant. Thus, terahertz ("THz") waveguides can be used to confine and transport a THz optical signal from a source location to a receiver location. For a 100 GHz=0.1 THz optical signal, the corresponding wavelength in solid fused silica is about 1.5 mm. At 300 GHz=0.3 THz, the corresponding wavelength is about 0.5 mm.

Most THz waveguides are made of a metal or a plastic and are not made of glass because the transmission of most glasses is not particular good at THz frequencies. While fused silica glass has relatively good transmission at THz frequencies, it is relatively fragile as compared to metal and plastic and therefore makes it difficult to form a commercially viable THz waveguide product. Said differently, a commercially viable THz waveguide product needs to have both sufficiently low loss in the THz frequency range and be mechanically robust so that it can operate for extended periods of time in a wide range of environments.

SUMMARY

Aspects of the disclosure are directed to methods forming glass-based THz waveguides. The THz waveguides can be formed using processes that are extensions of either fiber, ceramic and soot-based technologies as applied to fused silica, ceramic $Al_2O_3$ or ULE materials in a flexible mechanical format. In an example, the material or materials used to form THz waveguides have a dielectric loss $D_f=\varepsilon_i/\varepsilon_r<0.005$ at 100 GHz or within a THz frequency range of 0.1 to 10 THz.

An aspect of the disclosure is a THz waveguide for guiding optical signals having a THz frequency in the range from 0.1 THz to 10 THz. The THz waveguide comprises: a core having a diameter D1 in the range from 30 m to 10 mm, the core comprising of or consisting of fused silica glass and having a refractive index $n_1$; and a cladding immediately surrounding the core, the cladding either comprising of or consisting of either a polymer or glass or glass soot and having a refractive index $n_2<n_1$ and an outer diameter D2 in the range from 100 µm to 12 mm.

Another aspect of the disclosure is a THz data transmission system, comprising: the THz waveguide described above and having a first end and a second end; a THz source operably coupled to the first end; and a THz receiver optical coupled to the second end.

Another aspect of the disclosure is a planar THz waveguide for guiding THz signals having a THz frequency in the range from 0.1 THz to 10 THz. The planar THz waveguide comprises: a core defined by a fused silica sheet of refractive index $n_1$ and having opposite first and second planar surfaces and a thickness in the range from 30 µm to 10 mm; and a cladding defined by first and second planar layers respectively disposed immediately adjacent the first and second planar surfaces of the core, the first and second layers comprising either a polymer or glass or glass soot, and having a refractive index $n_2<n_1$, with the first and second layers defining an outer dimension D2 in the range from 100 µm to 12 mm.

Another aspect of the disclosure is a method of forming a THz waveguide operable at a THz waveguide operable in a frequency range from 0.1 THz to 10 THz. The method comprises: surrounding a fused silica preform core having a first refractive index $n_1$ with a preform cladding having a second refractive index $n_2<n_1$ to form a THz waveguide preform, wherein the preform cladding comprises either a polymer, or at least one of fused silica in glass form and fused silica in soot form; and drawing the THz waveguide preform to form the THz waveguide, wherein the THz waveguide comprises: a) a waveguide core formed from the fused silica preform core and having a diameter D1 in the range from 30 µm to 10 mm, the core comprising or consisting of fused silica glass and having a refractive index $n_1$, and b) a waveguide cladding immediately surrounding the waveguide core and formed from the preform cladding, the waveguide cladding having outer diameter D2 in the range from 100 µm to 12 mm.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIGS. 4A through 4D illustrate an example method of forming a THz waveguide preform using a stacking process;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

General Requirements

Figure 1A:
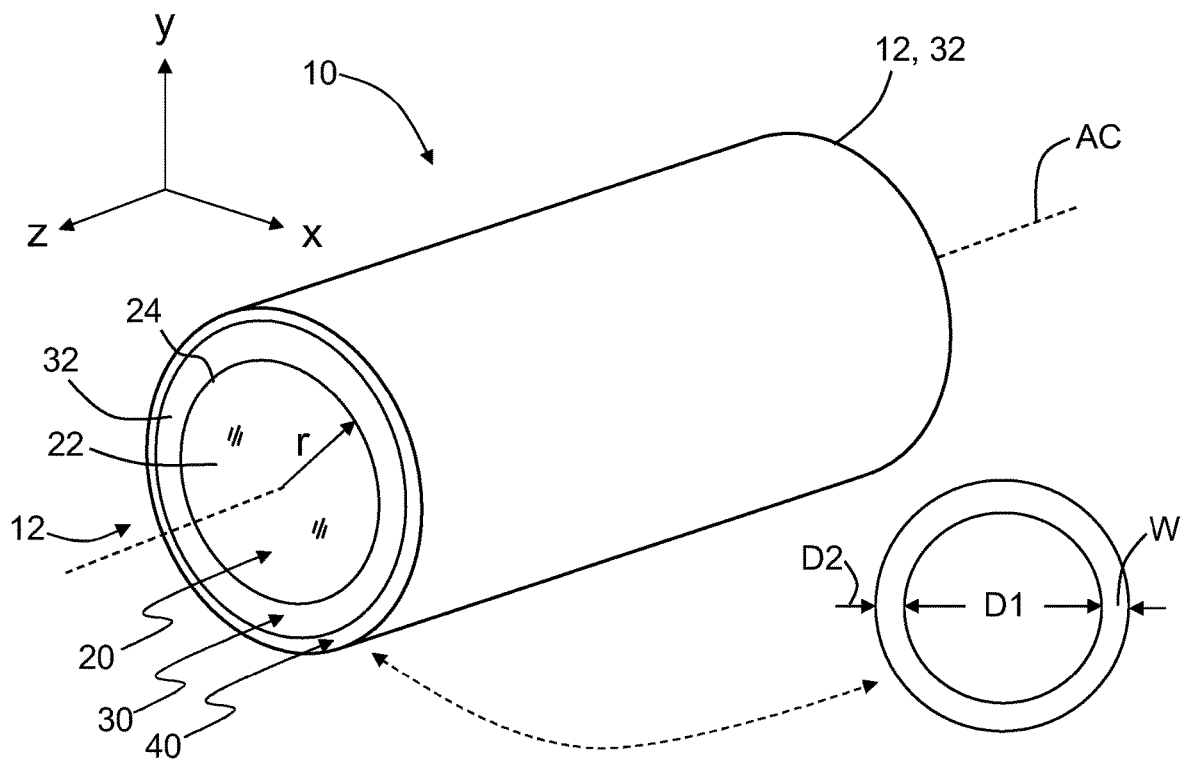
FIGS. 1A and 1B are front elevated views of two generalized examples of THz waveguides as disclosed herein.
Figure 1B:
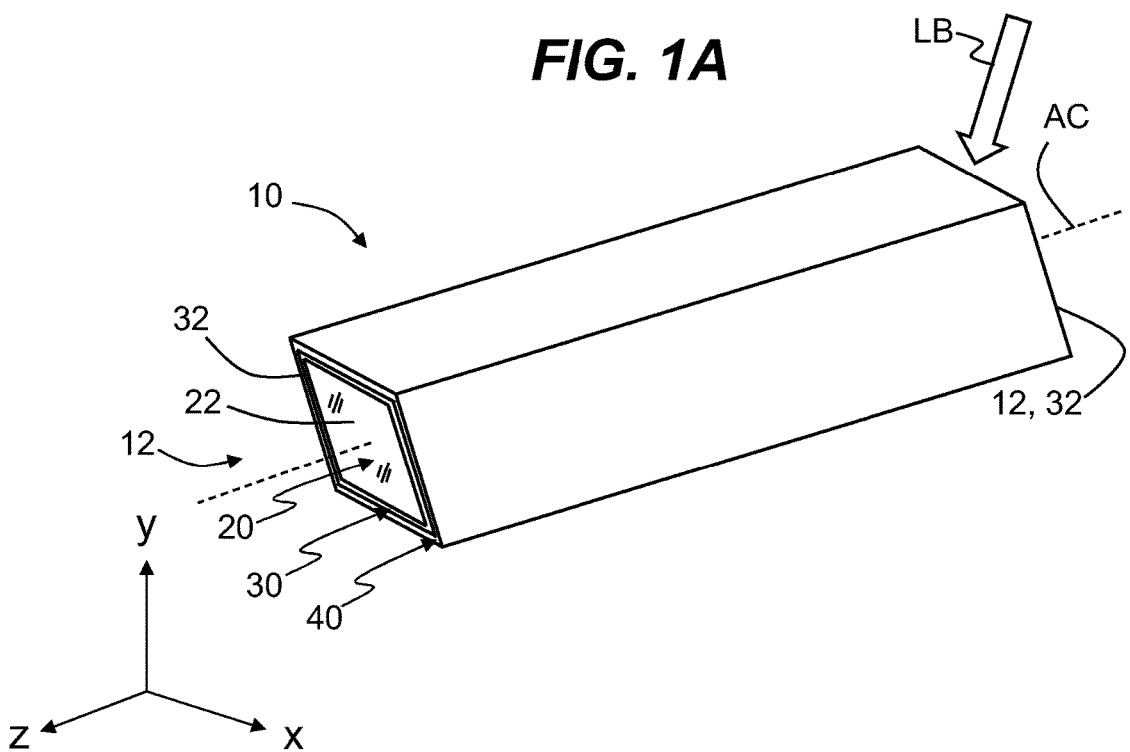

FIGS. 1A and 1B are front elevated views of two generalized examples of a THz waveguide 10 as disclosed herein, specific examples of which are discussed below. Cartesian coordinates are shown for the sake of reference. A radial coordinate r that resides in the x-y plane is also shown in FIG. 1A.

The THz waveguide 10 has a center line AC that runs longitudinally down the waveguide (i.e., in the z-direction as shown). The THz waveguide 10 has a core region ("core") 20 having an end face 22 and outer surface 24, and a cladding region ("cladding") 30 that immediately surrounds the outer surface of the core, with the core and cladding centered on the center line AC. The cladding 30 has an end face 32 and an outer surface 34. The end faces 22 and 32 define an end face 12 of the THz waveguide 10.

The core 20 and cladding 30 can be respectively referred to as the waveguide core and the waveguide cladding to distinguish from the preform core and the preform cladding, which are introduced and discussed below.

In the example of FIG. 1A, the core 20 has a circular cross-sectional shape while the cladding 30 has an annular or ring cross-sectional shape, with the core having a diameter D1 and the cladding having outer diameter D2. The cladding 30 has an annular width W=(D2−D1)/2. In the example of FIG. 1B, the core 20 has a rectangular cross-sectional shape while the cladding 30 has a rectangular-ring cross-sectional shape. Other cross-sectional shapes can also be employed.

In an example, the core 20 comprises glass, and further in the example can consist only of glass. The core 20 has a first or core dielectric constant $\varepsilon_1$. In an example, the cladding 30 comprises glass and further in the example can consist only of glass. In other examples, the cladding 30 comprises a polymer or consists only of a polymer. The cladding 30 has a second or cladding dielectric constant $\varepsilon_2 < \varepsilon_1$ so that $n_1 < n_2$, where $n_1 = (\varepsilon_1/\varepsilon_0)^{1/2}$ and $n_1$ is the refractive index of the core while $n_2 = (\varepsilon_2/\varepsilon_0)^{1/2}$ is the refractive index of the cladding, and where $\varepsilon_0$ is the electric permittivity of free space.

In an example, the core dielectric constant $\varepsilon_1$ (and thus the core refractive index $n_1$) can vary as a function of distance from the center line AC, e.g., as a function of radius r in FIG. 1A. The cross-sectional shapes of the core 20 and cladding 30 can be round or rectangular as shown in FIGS. 1A and 1B respectively, and can also be slab or have other reasonable cross-sectional shape.

There are multiple methods disclosed herein to reduce the dielectric constant $\varepsilon_2$ of the cladding 30 so that $\varepsilon_2 < \varepsilon_1$. These methods can include stacking and drawing of capillary tubes, core drilling of preforms, tape casting, or extruding soot onto HPFS core layers, as discussed in greater detail below.

In an example, a protective coating 40 immediately surrounds the outer surface 34 of the cladding 30. In an example, the protective coating 40 comprises one or more layers of an environmentally resistant material. In an example, the protective coating 40 defines a hermitic seal to prevent moisture from entering the cladding 30. In another example, the protective coating 40 can be a continuous conducting layer made of a metal, which can change the mode properties of the THz waveguide 10. In an example, the protective coating 40 prevents physical contact of external objects with the cladding 30 and core 20, which can result in transmission loss. The protective coating 40 can also be made of a material (e.g., a polymer) designed to protect the THz waveguide 10 from physical mechanical damage. In an example, the waveguide end face 12 can be prepared in high volume using laser stripping and laser cutting processes.

In an example, the protective coating 40 comprises a thin non-hydrogen bonding material that can be applied during a drawing process used to form the THz waveguide 10. In an example, the protective coating 40 is formed using a plasma-sputtering tool followed by a tool that applies a standard polymer buffer coating to provide mechanical protection. The plasma coating ensures hermitic adhesion to the glass material used for the cladding 30. In an example, a carbon plasma can be used that reacts with the outer layer of $SiO_2$ in the cladding to form a skin of SiC. In another example, with increased gas flow of source material, the plasma can be injected to create a separate over coat layer of SiC, or diamond-like carbon (DLC), or silicon nitride, SiNx. In an example, hydrophilic monolayers could also be considered like Hexamethyldisilazane (HMDS) or equivalent.

In an example, the THz waveguide 10 has a dielectric loss $D_f$<0.005 at 100 GHz and is sufficiently flexible to be bent into a curve. In another example, the dielectric loss $D_f$<0.0025 at 100 GHz.

In an example, the core 20 and cladding 30 are formed from at least one of: fused silica in glass form, fused silica in soot form, $Al_2O_3$, an ultralow-expansion (ULE) glass or a ULE soot, e.g., <10% $TiO_2$. Here, "ULE" means a coefficient of thermal expansion of less than $3 \times 10^{-8}/°$ C.

If soot is used as the material, then it can be extruded and partially or fully sintered to drive off water and leftover organics from the flame hydrolysis process. If it is partially sintered, the voids that are formed during the sintering process can be filled with a low loss vapor or polymers to provide a "fiber glass" having good mechanical fracture toughness.

Figure 3A:
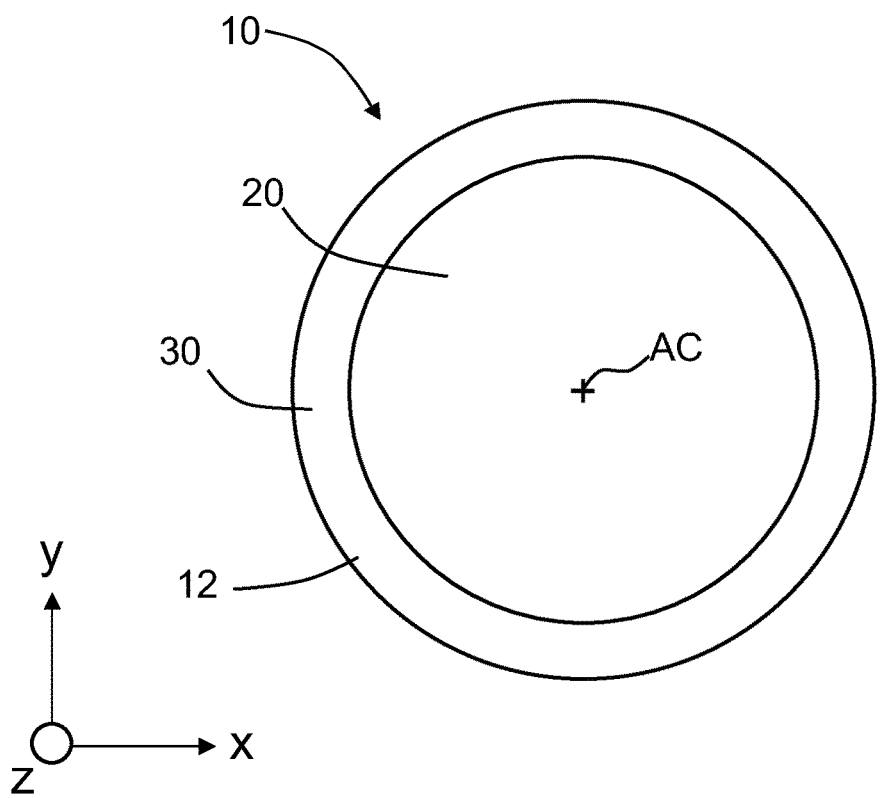
FIG. 3A is a cross-sectional view of an example THz waveguide that employs a solid silica core, a low-density silica cladding, and a thin protective coating surrounding the cladding.
Figure 3B:
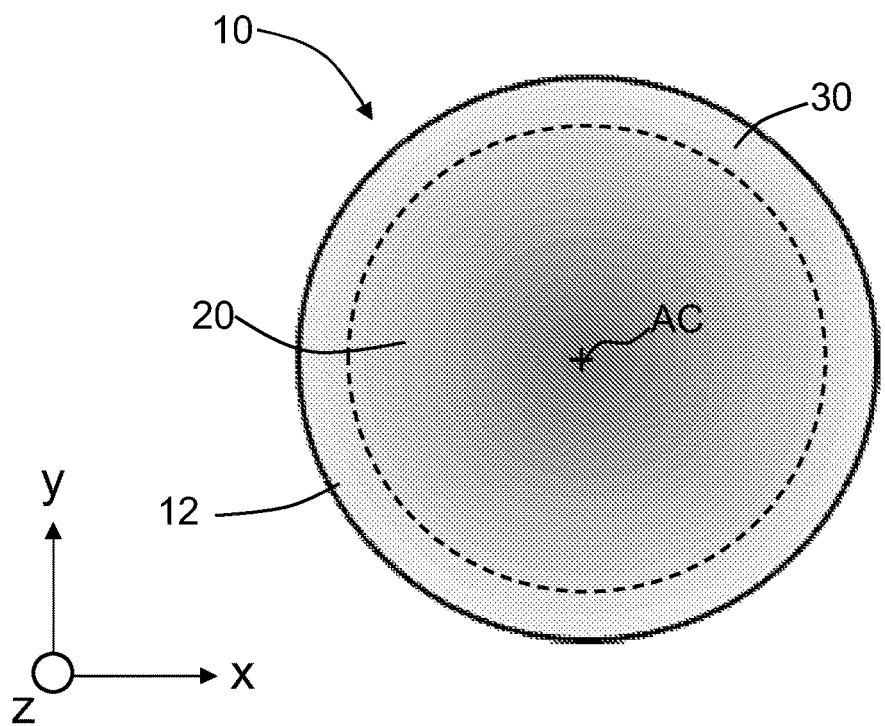
FIG. 3B is similar to FIG. 3A and illustrates an example of a gradient-index cladding.

If fused silica glass is employed, then the cladding 30 can comprise microstructures 100, as described in greater detail below. In an example, the microstructures 100 comprise longitudinally extending air lines 102 (also called "gas lines" or "air holes" or "voids") can be processed to achieve a select cladding dielectric constant $\varepsilon_2$. The microstructures 100 can also be configured to reduce bending loss. In another example, the core 20 can have a radially varying dielectric constant $\varepsilon_1(r)$ (e.g., a radial gradient). In another example, combinations that employ a fused silica bait rod plus an extruded soot cladding can be used. In an example, a rotor process can be used to create density variations that translate into variation in the core dielectric constant $\varepsilon_1$ and thus the core refractive index $n_1$. In another example, the core 20 and the cladding 30 can be made of a solid material, i.e., having no microstructures such air lines or like pockets, cavities, etc., such as shown in FIGS. 3A and 3B, below.

Optical fibers microstructures are configured to operate at optical frequencies, e.g., in the range from about $2 \times 10^5$ GHz (wavelength of 1500 nm) to $6 \times 10^5$ GHz (wavelength of 500 nm) are known. Photonic crystal optical fibers are one such type of optical fiber. However, THz frequencies are significantly different than optical frequencies when it comes to transmission of signals through materials. Information on both the loss mechanisms and materials with low loss at THz frequencies is sparse. In addition, there are only a few classically known, low-loss materials at THz wavelengths. Two such materials are fused silica and polytetrafluoroethylene (PTFE), each of which can have a dielectric loss $D_f$ of about 0.005 or smaller at 100 GHz.

Unfortunately, using either of these two materials to form a commercially viable THz waveguide product is problematic. Fused silica glass is fragile and so can easily fracture. PTFE is difficult to work with because other materials do not readily adhere to it, and it is not dimensionally stable at high working temperatures. Materials that fall into the category of soft-glasses (i.e., a relatively high coefficient of thermal expansion and a relatively low melting temperature) do not have a sufficiently small dielectric loss $D_f$ to transport a THz signal over meaningful distances.

The THz waveguide 10 disclosed herein use the aforementioned materials, such as glass and PTFE, that in theory have good THz transmission properties but whose mechanical properties have to date prevented them from being used in a commercially viable THz waveguide product, i.e., a one that has acceptable low dielectric loss $D_f$ while also having robust mechanical properties.

Optical frequency photonic crystal optical fibers require a guiding structure arranged in regular and exacting array. On the other hand, THz waveguides are not particularly sensitive to the periodic boundary conditions and so their fabrication is not as exacting. Also, certain types of microstructured optical fibers have a solid cladding that can distort the refractive index profile, causes more loss while also making the waveguides unduly rigid.

Embodiments of the THz waveguide 10 disclosed herein can have a soot-based cladding 30 or a cladding formed using high-density capillary tubes, with the cladding surrounding by thin protective coating 40. This results in a cladding 30 having a high air fraction. This example structure for cladding 30 provides more mechanical flexibility and a relatively low loss. In an example, the soot is either co-extruded or sequentially extruded with the protective coating 40 made of a polymer such as PTFE so that the cladding has fiberglass mechanical properties. Polymers used for protective coating 40 can have a lower dielectric constant than that of solid fused silica.

With ultra-pure fused silica materials in glass form or soot form, and with a microstructured cladding coated with a low-loss polymer or like material, it is believed that the loss of the resulting THz waveguide (e.g., a dielectric loss $D_f$<0.005 at 100 GHz or $D_f$<0.0025 at 100 GHz) is smaller than prior art THz waveguides. Furthermore, the use of extrusion of both glass and soot materials in forming THz waveguide preforms that are used to form THz waveguides disclosed herein results in THz waveguides that are mechanically robust. In addition, the example THz waveguides that are made using fused silica have a coefficient of thermal expansion (CTE) sufficiently low so that laser processing using as laser beam LB (see FIG. 1A) can be used to define at least one end face 32 on the THz waveguide 10 without damaging the THz waveguide.

Example Waveguides

FIGS. 2A through 2D are x-y cross-sectional views of four different example embodiments of THz waveguide 10 that employ a fused silica core 20 and a cladding 30 with microstructures 100 in the form of air lines 102. The air lines 102 define an air-fill fraction F, which is the total cross-sectional area of the air lines 102 divided by the total cross-sectional area of the cladding.

Figure 2A:
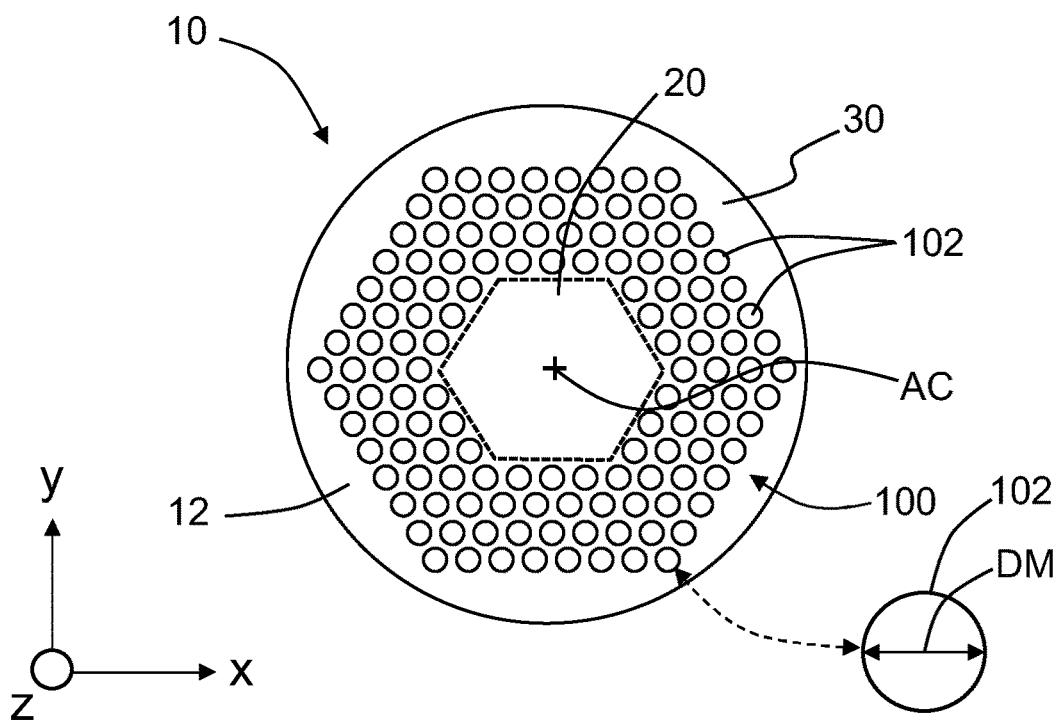
FIGS. 2A through 2D are x-y cross-sectional views of four different example embodiments of THz waveguide that employ a fused silica core and a microstructured cladding.
Figure 2B:
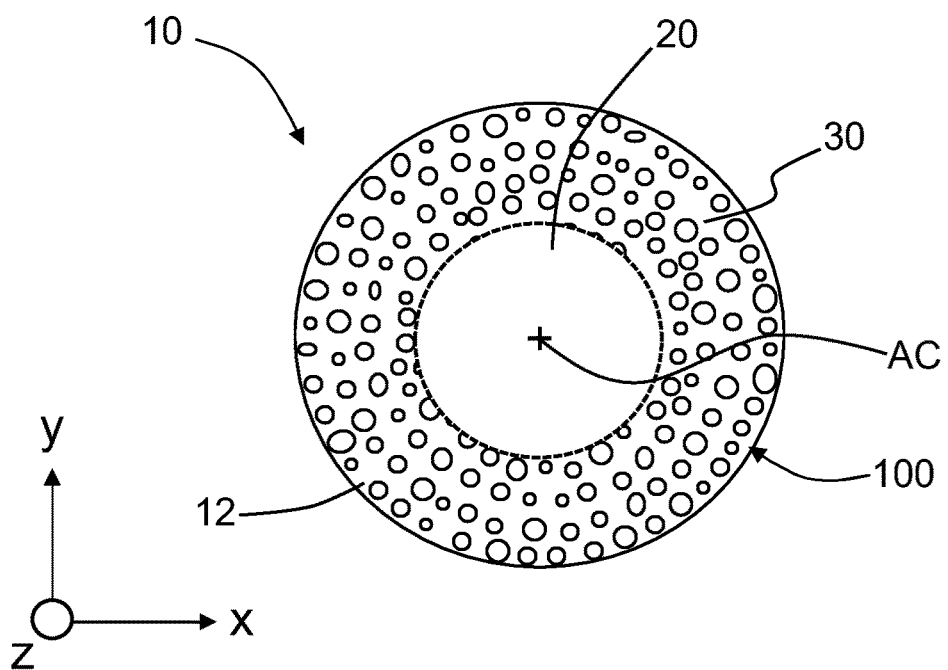

FIG. 2A shows an example of cladding 30 wherein the air lines 102 are periodically arranged. The air lines 102 have a diameter DM. Preferably, the air hole diameter DM is much smaller than a THz wavelength $\lambda$, e.g., less than 0.5$\lambda$. Under this condition, the refractive index $n_2$ of cladding 30 is the weighted average of the refractive indices of silica and air based on the air-fill fraction F, and so is smaller than the core refractive index $n_1$. The high-index core 20 and low-index cladding 30 define a waveguide in which the THz wave is guided by total internal reflection. For the averaging effect on the cladding refractive index $n_2$, a periodic arrangement of air lines 102 is not necessary, i.e., a non-periodic or quasi-periodic or random arrangement can also be used. Also, the air lines 102 do not need to have the same diameter or same shape. FIG. 2B illustrates an example THz waveguide 10 wherein the cladding 30 has a random arrangement of air lines 102 that vary in size and shape.

To get a sufficiently low cladding index $n_2$, the diameter DM of the air lines 102 is preferably less than 0.2$\lambda$, and more preferably the less than 0.1$\lambda$. The air fill fraction F is preferably greater than 2%, or more preferably greater than 5%, and even more preferably greater than 10%.

The percentage of refractive index change of the core refractive index $n_1$ relative to the average refractive index $n_2$ of the cladding is denoted $\Delta n=[(n_1-n_2)/n_1]\times 100$ and is preferably more than 0.5%, more preferably more than 2%, and even more preferably more than 5%.

Figure 2C:
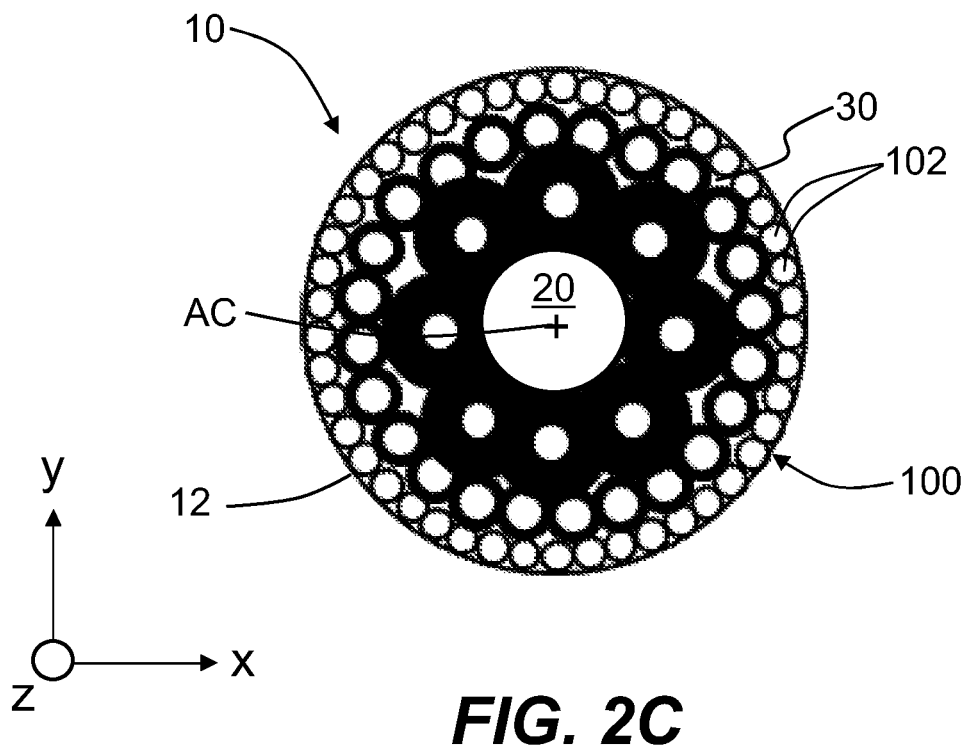

FIG. 2C shows an example where the air lines 102 define an air fill fraction F that varies as a function of radius (i.e., $F=F(r)$), wherein the density gradually increases with radius r. This forms effectively a graded-index (GRIN) profile for the cladding 30, which can be optimized for high-bandwidth multimode transmission.

Figure 2D:
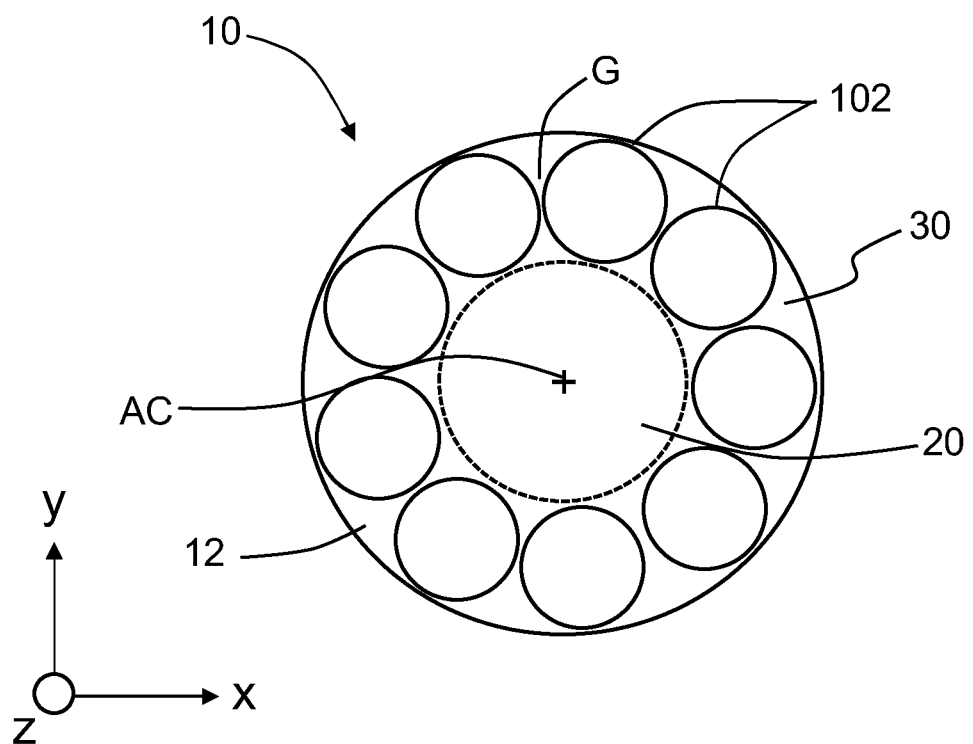

FIG. 2D shows an example wherein the cladding 30 has relatively large air lines 102, i.e., DM>>λ, such as DM>10λ, with gaps G between adjacent air lines. If the diameter DM of the air lines 102 are much larger than the wavelength λ, the THz waveguide 100 has virtually an air cladding. To avoid the tunneling loss in this case, the gap G between adjacent air lines 102 should be as small as possible, and preferably smaller than the wavelength λ.

FIG. 3A is a cross-sectional view of an example THz waveguide 10 that employs a solid silica core 20 and a low index material cladding 30 and a thin protective coating 40 surrounding the cladding. An example material for the cladding 30 is low-density silica such as silica soot. The cladding refractive index $n_2$ can be constant (FIG. 3A) or radially graded so that the outer portion defines the cladding 30 (FIG. 3B). Another example material for the cladding 30 is a low-index polymer material such as polymethylpentene (TPX), polyethylene (PE), and polytetrafluoroethylene (PTFE or Teflon). When a polymer is used for cladding 30, the protective coating 40 is not needed. Because the THz wave is mostly guided in the silica core 20, the THz waveguide 10 has lower loss and is more stable than like waveguides made from entirely of polymer materials.

In an example, the THz waveguide 10 has no metal and the index of refraction difference Δn between the core 20 and the cladding 30 defines the waveguiding properties. As noted above, a signal having a frequency f=100 GHz in air would need a waveguide of dimension 3 mm or smaller, depending on the specific dielectric constant gradient, and total acceptable loss of the signal. While the configurations of the THz waveguide 10 proposed herein look similar to optical-frequency waveguide structures, the construction materials are different and thus the specific dielectric constant radial variations are different.

Figure 3C:
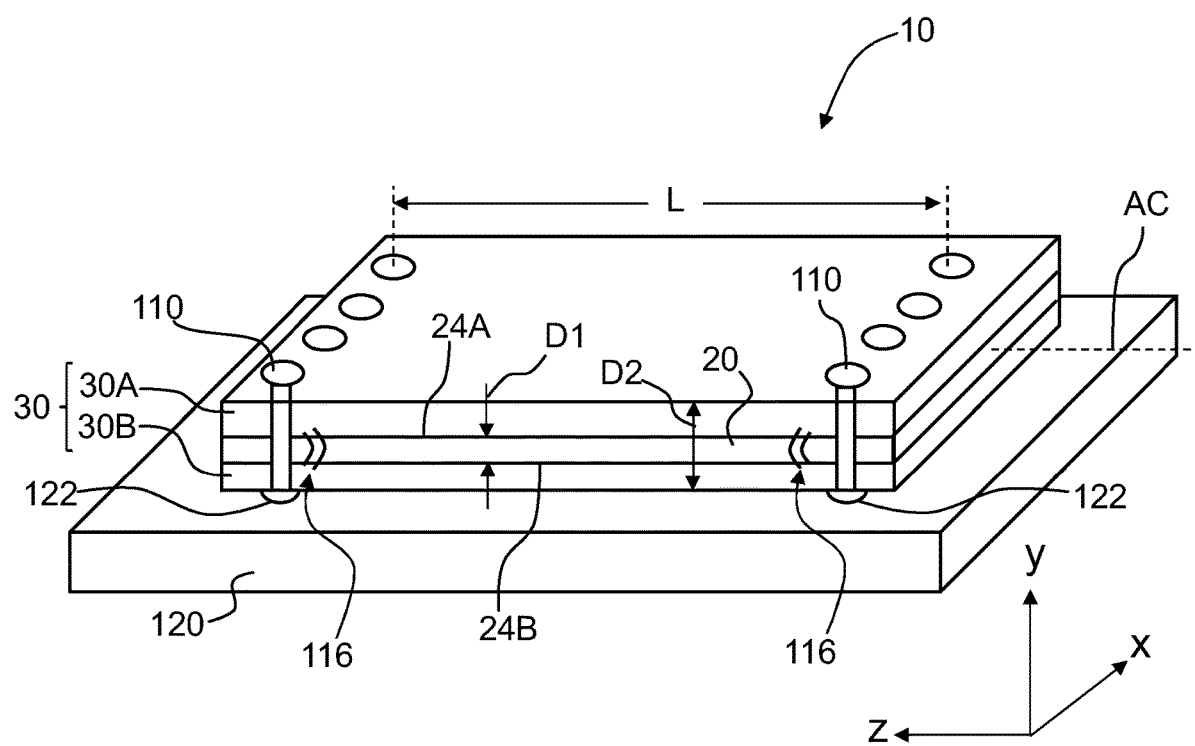
FIG. 3C is an elevated view of an example slab THz waveguide supported on a printed circuit board and showing conductive features that can be used to send and receive THz signals through the THz waveguide.

FIG. 3C is an elevated view of an example THz waveguide 10 having a slab configuration. The core 20 is planar and comprises a fused silica sheet with respective top and bottom planar outer surfaces 24A and 24B, while the cladding 30 is formed by first and second planar layers 30A and 30B respectively disposed immediately adjacent the top and bottom planar outer surfaces of the core. The core 20 has a thickness D1 while the cladding 30 defines an outer dimension (i.e., an outer thickness) D2. In an example, the thickness D1 in the range from 30 m to 10 mm while the outer dimension D2 is in the range from 100 m to 12 mm.

In an example, the first and second planar layers 30A and 30B of the cladding 30 are formed by tape casting a soot layer to the top and bottom planar outer surfaces 24A and 24B of the fused silica sheet. In an example, the fused silica sheet can be made of Corning® HPFS® glass, available from Corning, Inc., Corning, N.Y. The THz waveguide 10 of FIG. 3C is shown as including conducting features 110 that extend through the first and second cladding layers 30A and through the core 20 can be used to transmit and receive THz signals 116. In an example, the planar THz waveguide 10 of FIG. 3C can be supported by a printed circuit board (PCB) 120 that includes electrical contacts 122 that are in electrical contact with the conducting features 110. In an example, the PCB 120 is configured (e.g., with THz-source and receiver ICs, not shown) to transmit and receive the THz signals 116 using the conducting features 110. In an example, the conducting features 110 are axially separated by a distance L, wherein L≤20 mm. The maximum distance for L represents an example practical distance over which THz signals 116 can travel within the THz waveguide 10 from one conducting feature 110 to another in the axial direction, e.g., from a source to a receiver (see also FIG. 10).

Methods of Fabricating the THz Waveguides

In one example, the THz waveguides 10 disclosed herein can made by a stack and draw method. With reference first FIG. 4A, a core glass rod 220 is made with a desired shape, for example round or hexagonal. As noted above, the glass core rod 220 can comprise or consist of fused silica. The core glass rod 220 defines a preform core and has an outer surface 222.

With reference now to FIG. 4B, glass tubes 224 with desired inner and outer diameters are prepared.

With reference now to FIG. 4C, after the core glass rod 220 and glass tubes 224 are prepared, the glass tubes are stacked around the core glass rod about the outer surface 22 to form a core and tube assembly 230.

With reference now to FIG. 4D, the core and tube assembly 230 is inserted into a large glass sleeve 240 to make a preform 300 that can be used to form the THz waveguides 10. The glass tubes 224 and the glass sleeve 240 define a preform cladding. The preform 300 and like preforms discussed herein are referred to hereinafter as the "THz waveguide preform" 300. The THz waveguide preform 300 can be drawn into the THz waveguide 10 with a conventional fiber draw tower using techniques known in the art such as described below in connection with FIG. 9.

Figure 5A:
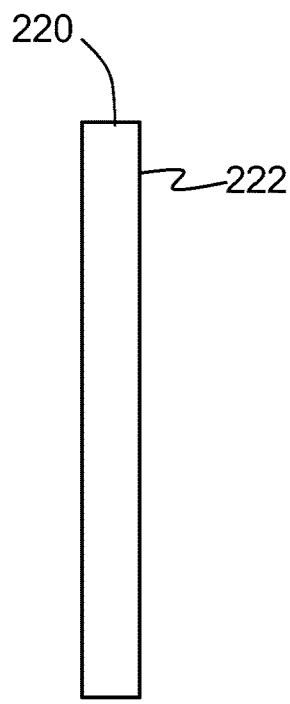
FIGS. 5A through 5C are cross-sectional views that illustrate an example method of forming a THz waveguide preform using a sintering process.
Figure 5B:
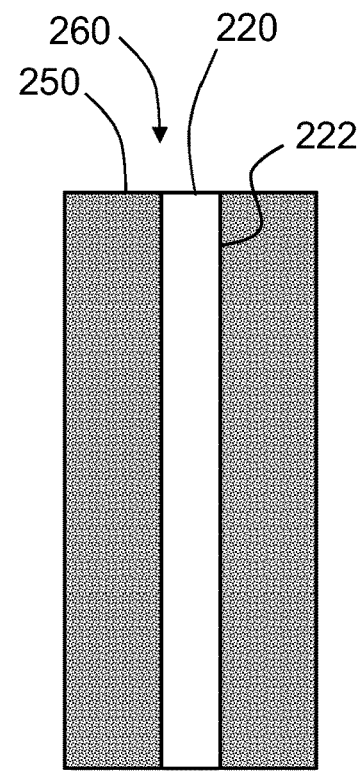
Figure 5C:
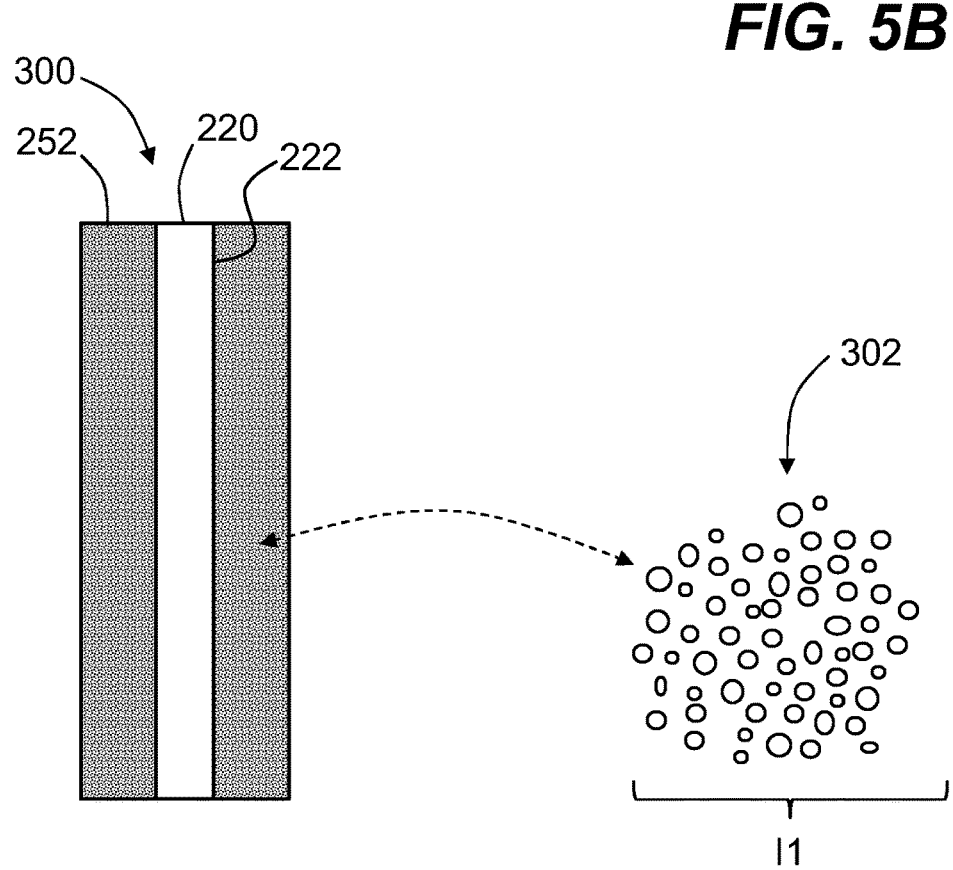

A method for making a THz waveguide preform 300 that can be used to form a THz waveguide 10 with air lines 102 in the cladding 30 is now described with reference to the cross-sectional views of FIGS. 5A through 5C. First, with reference to FIG. 5A, the core glass rod 220 is formed. Then, with reference to FIG. 5B, glass soot 250 is deposit onto the core glass rod 220 using for example an outside vapor deposition method to define a soot blank 260. The soot blank 260 with the core glass rod 220 in the center is then sintered using known techniques to form the THz waveguide preform 300 as shown in FIG. 5C, with the glass soot 250 becoming a sintered (or partially sintered) glass 252. In an example, the sintering is performed in a furnace at a temperature in the range from 1300° C. to 1500° C. with a gas atmosphere, for example, air, $N_2$, $O_2$, Ar, $SO_2$, Kr. The gas is trapped in the glass soot 250 during sintering process to form bubbles 302 having a random distribution, such as shown in the close-up inset 11 of FIG. 5C. The THz waveguide preform 300 with the random gas bubbles can be drawn onto the THz waveguide 10 using a conventional draw tower and conventional drawing techniques. During the drawing process, the randomly distributed gas bubbles are longitudinally stretched into randomly distributed air lines or gas lines 102 in the cladding 30 discussed above.

Figure 6A:
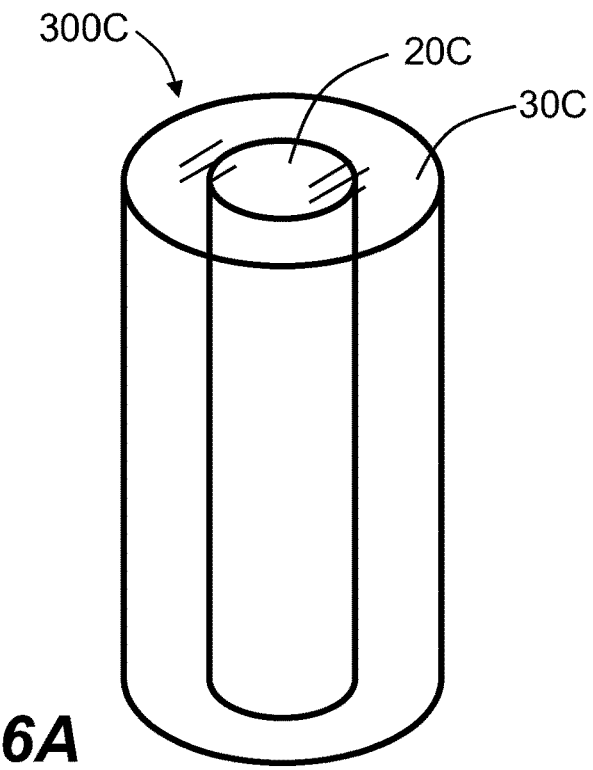
FIGS. 6A and 6B illustrate an example method of forming a THz waveguide preform using a drilling process.
Figure 6B:
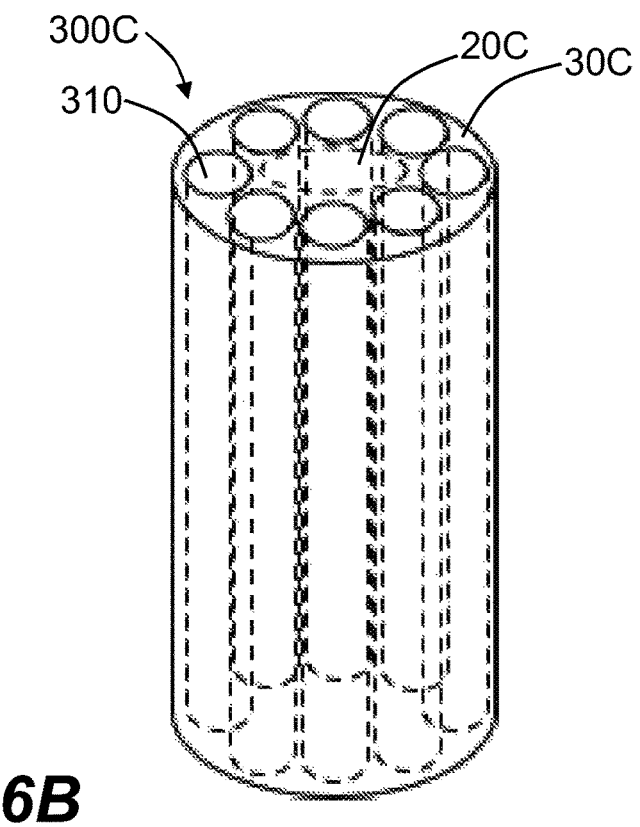

Another method of fabricating a THz waveguide 10 that has a cladding 30 with air lines 102 is to first make a conventional glass preform 300C with a core section 20C and a cladding section 30C, as shown in FIG. 6A. Then, cylindrical holes 310 can be formed in a ring configuration in the cladding 30C using a mechanical drilling process, as shown in FIG. 6B. The ring of holes 310 defines a low index cladding section 30C that surrounds the central core section 20C. In a similar example, the hole structure of FIG. 6B can be drilled in the glass soot 250 of FIG. 5B before the cladding 30C is sintered into glass.

In another example method, a THz waveguide 10 fiber with pure silica core 20 and low-index (i.e., $n_2<n_1$) polymer cladding 30 can be made by drawing a pure silica THz waveguide preform 300 into a fiber using a conventional draw tower. After the fiber exits the draw furnace and cooled down to about room temperature, a liquid polymer material is then coated onto the fiber and then cured using a UV light source to form a low-index polymer cladding 30, with the silica glass fiber defining the core 20. Because the THz wave is mostly guided in the silica core 20, the THz waveguide can have lower loss and is more stable than THz waveguides that have a polymer core.

Figures 7A, 7B:
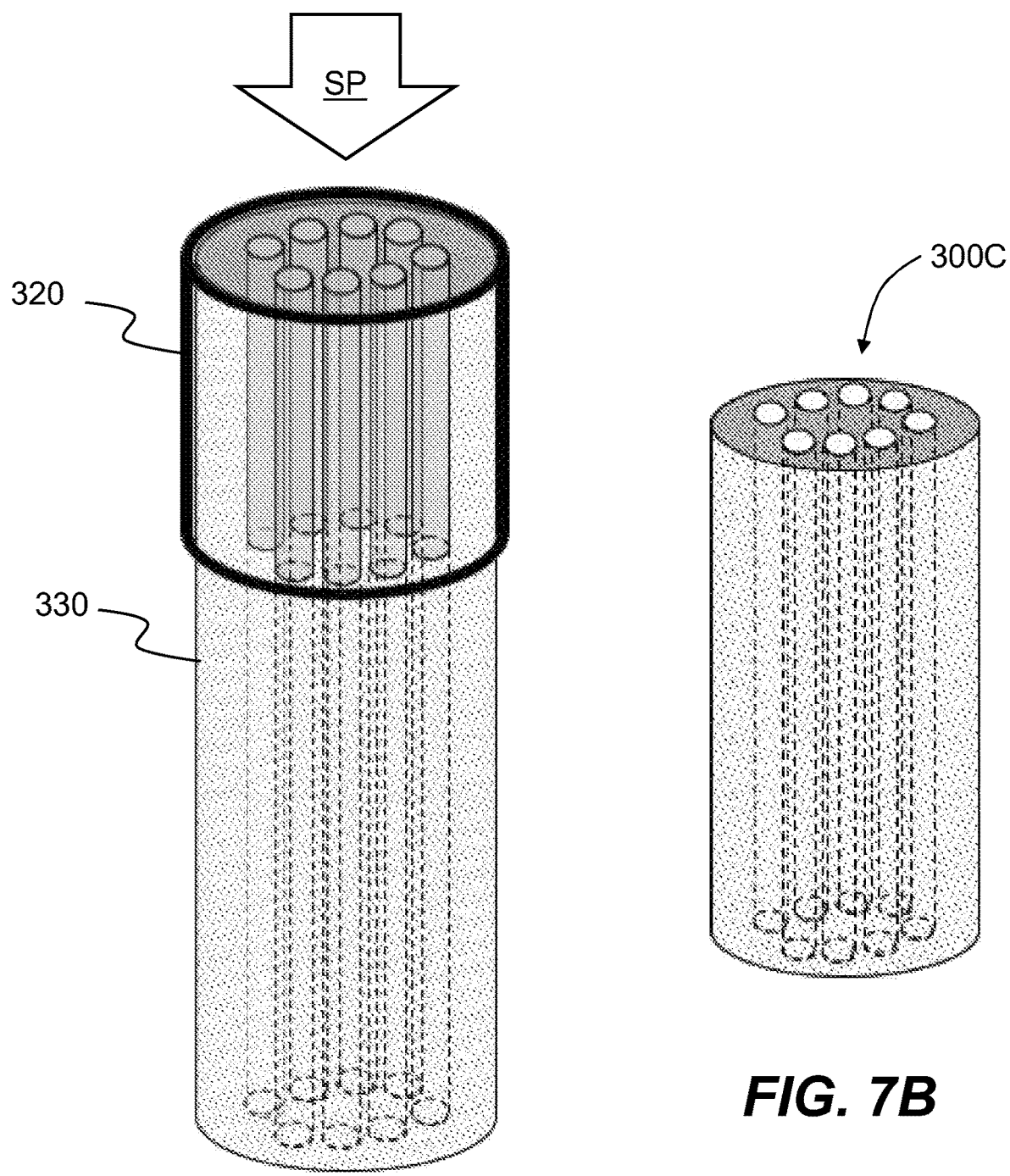
FIGS. 7A and 7B illustrate an example method of forming a THz waveguide preform by extruding a soot paste through a die to form a soot structure, and then cutting the soot structures into sections and sintering the extruded soot structure section.

Another method for making THz waveguide preforms is to use soot extrusion process, as schematically illustrated in FIGS. 7A and 7B. Silica soot can be generated by an OVD process and collected as soot powders. Then the soot powders are mixed with water, organic solvent and a binding agent to form soot past SP. Then the soot paste SP is fed to an extrusion machine (not shown) and pushed through a die 320 to form a hole structure 330, as shown in FIG. 7A. Then the extruded hole structure 330 is cut into sections with a desired length to form soot paste preforms. The soot paste preform is dried and cleaned with chemical such as chlorine and sintered in a furnace to form a glass THz waveguide preform 300, as shown in FIG. 7B.

In another example, a low-density silica material for the cladding 30 can be made by consolidating silica soot at a lower temperature $T_C$ than the temperature $T_G$ required to form fully densified glass. The low-density silica material so formed is referred to herein as consolidated glass. In an example, the glass-forming temperature $T_G$ is about 1500° C. A graded-density cladding 30 can be defined by grading the porous silica soot using multiple thermal densification steps, or process variants or by a tape casting extrusion that is partially consolidated to drive off water to cause bridging or necking of the soot particles.

Figure 8:
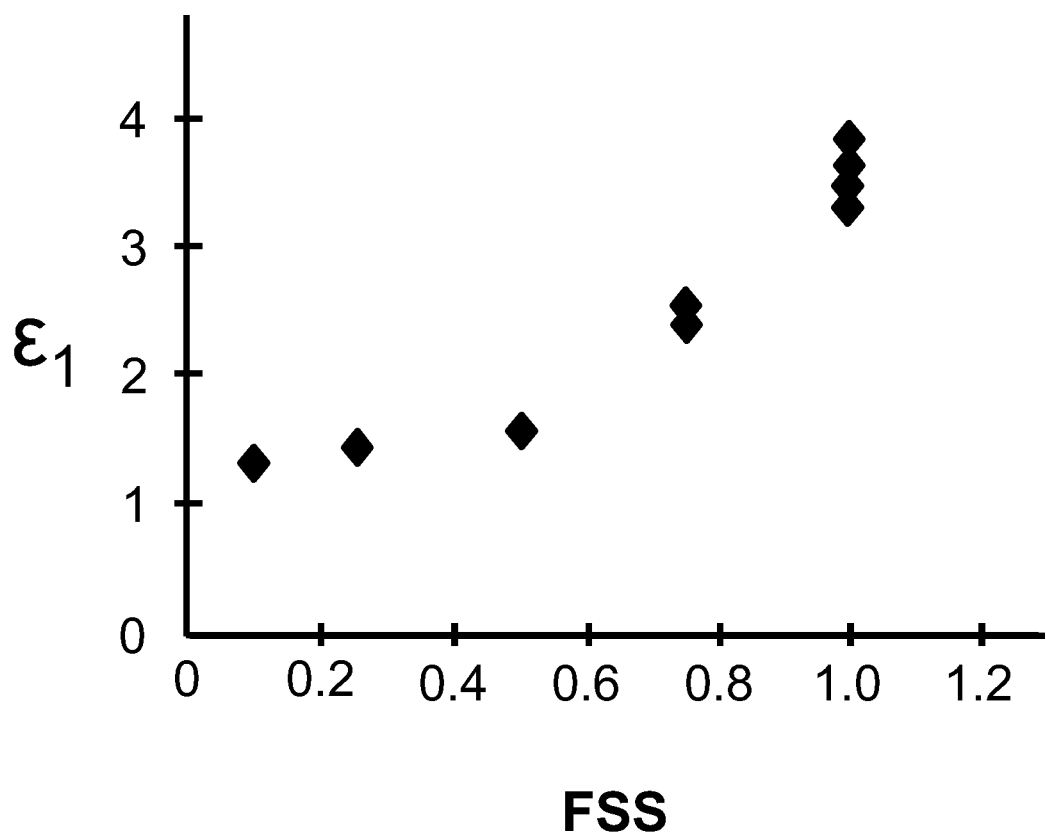
FIG. 8 is a plot of the fraction FSS of sintered soot to unsintered soot in a glass soot material versus the dielectric constant $\varepsilon_1$ of the soot material, illustrating how the dielectric constant of the soot material can vary with the fraction FSS.

FIG. 8 is a plot of the fraction FSS of sintered soot to unsintered soot in an example glass soot material formed at a temperature $T_C<T_G$ versus the dielectric constant $\varepsilon_1$ of the soot material. The plot of FIG. 8 shows data obtained from the above-described partial sintering process wherein the dielectric constant $\varepsilon_1$ of the soot material has dielectric constant gradient starting from $\varepsilon_1=\varepsilon_0=1$ for air to that for a solid, high-purity fused silica for which $\varepsilon_1=3.895$.

Drawing Process

Figure 9:
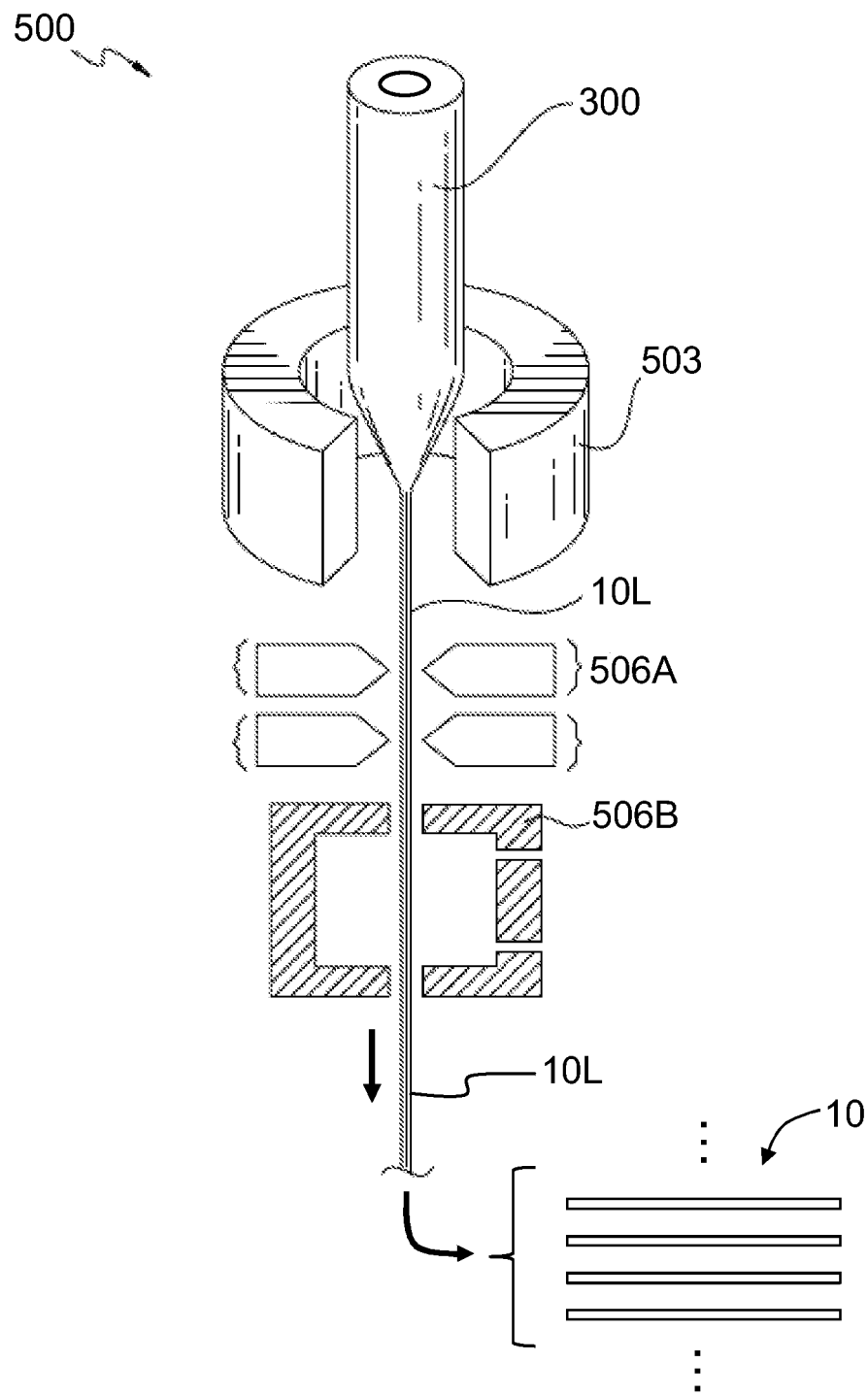
FIG. 9 is a schematic diagram of an example drawing system that can be used to form the THz waveguides from the THz waveguide preforms as disclosed herein.

As discussed above, the THz waveguide 10 can be formed using a drawing process. FIG. 9 is a schematic diagram of an example drawing system 500 for forming THz waveguides 10 using the THz waveguide preform 300. The drawing system 500 may comprise a draw furnace 503 for heating the THz waveguide preform 300. The THz waveguide preform has generally the same relative shape as the desired THz waveguide 10, but is much larger, e.g., 25× to 100× larger. The configuration of the THz waveguide preform 300 and the various drawing parameters (draw speed, temperature, tension, cooling rate, etc.) dictate the final form of THz waveguide 10.

In the fabrication process, the drawn THz waveguide preform 300 exits the draw furnace 503 and has the general form of the desired THz waveguide 10 but is one long continuous THz waveguide structure 10L. After the long THz waveguide structure 10L exits the draw furnace 503, its dimensions can be measured using non-contact sensors 506A and 506B. Tension may be applied to the long THz waveguide structure 10L by any suitable tension-applying mechanism known in the art.

After the dimensions of the long THz waveguide structure 10L are measured, the THz waveguide structure may be passed through a cooling mechanism 508 that provides slow cooling of the guide tube. In one embodiment, the cooling mechanism 508 is filled with a gas that facilitates cooling of the guide tube at a rate slower than cooling the guide tube in air at ambient temperatures.

Once the long THz waveguide structure 10L exits the cooling mechanism 508, it can be either cut into select lengths to define the final THz waveguides 10 as shown, or it can be wound around a spool (not shown).

In an example, the THz waveguides 10 can be fabricated by performing a first draw process using the THz waveguide preform 300 to form an intermediate-sized glass preform, and then re-drawing the intermediate-sized glass preform using a second draw process to form the THz waveguides 10.

Applications

Figure 10:
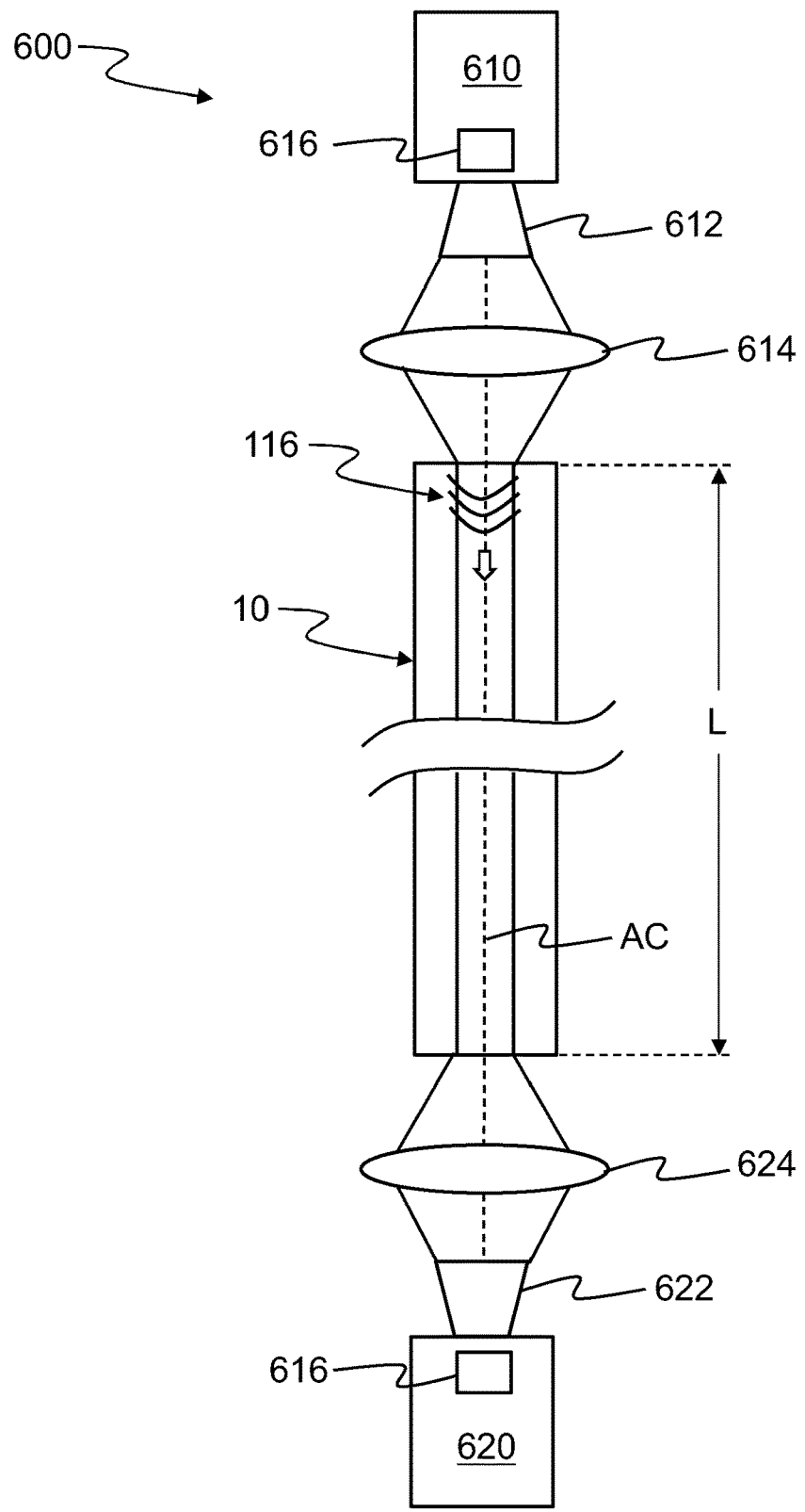
FIG. 10 is a schematic diagram of an example high-speed THz transmission system that employs a THz waveguide as disclosed herein.

FIG. 10 is a schematic diagram of an example high-speed THz transmission system 600 that includes a THz waveguide 10 as disclosed herein, along with a THz source 610 and a THz receiver 620. In an example, the THz source 610 and the THz receiver 620 each include an integrated circuit (IC) THz oscillator 616, such as a silicon CMOS THz oscillator chip. In an example, the THz source 610 and the THz receiver 620 can include respective horn antennas 612 and 622, which can be operably disposed relative to respective optical systems 614 and 624. THz signals 116 are transmitted from the THz source 610 to the THz receiver 620 via the THz waveguide 10, which in an example has a length $L \leq 10$ m, wherein the maximum length L represents a practical limit on the transmission of the THz signals 116 over the THz waveguide.

The THz signals 116 can have either a digital or analog format. For digital formats, it is especially easy to turn on and off the THz source 610. Conventional analog modulation formats using homodyne or heterodyne methods can also be employed.

Silicon CMOS THz oscillators 616 can function in higher temperature environments than traditional lasers for data communication. Specifically, a CMOS THz oscillator 616 is typically rated to function reliability up to 150° C., whereas VCSEL lasers are typically limited to 85° C. Consequently, the CMOS THz source/receiver combination of the THz transmission system 600 of FIG. 10 are well suited for chip-to-chip communications in relatively hot environments, such as next to a hot-switch ASIC in a data center, or in automobiles.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A terahertz (THz) waveguide for guiding THz optical signals having a THz frequency in the range from 0.1 THz to 10 THz, comprising:
   a core having a diameter D1 in the range from 30 μm to 10 mm, the core comprising of or consisting of fused silica glass and having a first refractive index $n_1$; and a cladding immediately surrounding the core, the cladding either comprising of or consisting of either a polymer or glass or glass soot and having a second refractive index $n_2$ and an outer diameter D2 in the range from 100 μm to 12 mm, wherein the second refractive index $n_2$ is less than the first refractive index $n_1$, wherein the first refractive index $n_1$ and the second refractive index $n_2$ are such that the THz optical signals are guided by internal reflection so that the THz optical signals are primarily transmitted through the core, wherein the cladding comprises microstructures comprising longitudinally extending air lines, and wherein the THz waveguide has a dielectric loss $D_f<0.005$ at a frequency of 100 GHz.

2. The THz waveguide according to claim 1, wherein the core and the cladding each comprise at least one of: fused silica in glass form, fused silica in soot form, $Al_2O_3$, an ultralow-expansion (ULE) glass, and a ULE soot, wherein the ULE glass and the ULE soot each has a coefficient of thermal expansion of less than $3\times10^{-8}/°C$.

3. The THz waveguide according to claim 2, wherein a center line runs longitudinally down a center of the core and wherein the second refractive index of the cladding has a gradient that decreases with increasing distance from the center line.

4. The THz waveguide according to claim 1, wherein the cladding comprises either polymethylpentene (TPX), polyethylene (PE), or polytetrafluoroethylene (PTFE).

5. The THz waveguide according to claim 1, wherein the air lines are randomly arranged, wherein the THz frequency corresponds to a THz wavelength λ, and wherein the air lines have a diameter DM<0.2λ.

6. The THz waveguide according to claim 1, wherein the air lines have an air fill fraction greater than 2%.

7. The THz waveguide according to claim 1, wherein the THz frequency corresponds to a THz wavelength λ, and wherein the air lines have a diameter DM>10λ.

8. The THz waveguide according to claim 1, wherein the core has a circular cross-sectional shape and the cladding has an annular cross-sectional shape.

9. The THz waveguide according to claim 1, further comprising a protective coating disposed over the cladding that hermetically seals the cladding.

10. The THz waveguide according to claim 1, wherein the protective coating is made of at least one of: a metal, silicon carbide, diamond-like carbon, and silicon nitride.

11. A planar terahertz (THz) waveguide for guiding THz optical signals having a THz frequency in the range from 0.1 THz to 10 THz, comprising:

as core defined by a fused silica sheet having a first refractive index $n_1$, opposite first and second planar surfaces, and a thickness in the range from 30 μm to 10 mm; and a cladding defined by first and second planar layers respectively disposed immediately adjacent the first and second planar surfaces of the core, the first and second layers comprising either a polymer or glass or glass soot having a second refractive index $n_2$, wherein the second refractive index $n_2$ is less than the first refractive index $n_1$, with the first and second layers defining an outer dimension D2 in the range from 100 μm to 12 mm, wherein the first refractive index $n_1$ and the second refractive index $n_2$ are such that the THz optical signals are guided by internal reflection so that the THz optical signals are primarily transmitted through the core, wherein the cladding comprises microstructures comprising longitudinally extending air lines, and wherein the planar THz waveguide has a dielectric loss $D_f<0.005$ at a frequency of 100 GHz.

12. The planar THz waveguide according to claim 11, wherein the first and second planar layers of the cladding comprise either consolidated glass soot or at least partially sintered glass soot.

13. The planar THz waveguide according to claim 11, wherein the cladding comprises either polymethylpentene (TPX), polyethylene (PE), or polytetrafluoroethylene (PTFE).

14. The planar THz waveguide according to claim 11, further comprising:

a printed circuit board; and conducting features that pass through the cladding and the core and that are in operable contact with the printed circuit board to generate and receive the THz signals.

15. The planar THz waveguide according to claim 11, wherein the conducting features are axially separated by a distance L≤20 mm.

* * * * *

UNITED STATES PATENT AND TRADEMARK OFFICE
CERTIFICATE OF CORRECTION

PATENT NO. : 11,467,334 B2  
APPLICATION NO. : 16/638604  
DATED : October 11, 2022  
INVENTOR(S) : Ming-Jun Li et al.

Page 1 of 1

It is certified that error appears in the above-identified patent and that said Letters Patent is hereby corrected as shown below:

On the Title Page

In item (56), in Column 2, under "Other Publications", Line 2, delete "Mili" and insert -- Milli --.

On the page 2, in item (56), in Column 2, under "Other Publications", Line 7, delete "(2006." and insert -- (2006). --.

On the page 2, in item (56), in Column 2, under "Other Publications", Line 22, delete "(2011." and insert -- (2011). --.

Signed and Sealed this  
Sixteenth Day of May, 2023

Katherine Kelly Vidal  
*Director of the United States Patent and Trademark Office*